United States Patent
Komatsu et al.

(10) Patent No.: US 9,350,261 B2
(45) Date of Patent: May 24, 2016

(54) POWER CONVERTER APPARATUS APPLIED TO WIND POWER GENERATION SYSTEM

(71) Applicant: TOSHIBA MITSUBISHI-ELECTRIC INDUSTRIAL SYSTEMS, Minato-ku (JP)

(72) Inventors: Hiroyoshi Komatsu, Tokyo (JP); Tomohisa Ohkami, Tokyo (JP); Manabu Souda, Tokyo (JP)

(73) Assignee: TOSHIBA MITSUBISHI-ELECTRIC INDUSTRIAL SYSTEMS CORPORATION, Minato-ku (JP)

( * ) Notice: Subject to any disclaimer, the term of this patent is extended or adjusted under 35 U.S.C. 154(b) by 159 days.

(21) Appl. No.: 13/846,244

(22) Filed: Mar. 18, 2013

(65) Prior Publication Data
US 2013/0215652 A1  Aug. 22, 2013

Related U.S. Application Data

(63) Continuation of application No. PCT/JP2010/066389, filed on Sep. 22, 2010.

(51) Int. Cl.
*H02M 5/458* (2006.01)
*H02J 3/38* (2006.01)

(52) U.S. Cl.
CPC .............. *H02M 5/458* (2013.01); *H02J 3/386* (2013.01); *Y02E 10/763* (2013.01)

(58) Field of Classification Search
CPC ....... H02M 1/12; H02M 7/493; H02M 5/458; H02M 2001/007; H02M 2001/123
USPC .................................... 363/34, 35, 37; 290/44
See application file for complete search history.

(56) References Cited

U.S. PATENT DOCUMENTS 5,225,712 A * 7/1993 Erdman ........................ 290/44
5,499,178 A * 3/1996 Mohan ......................... 363/39

(Continued)

FOREIGN PATENT DOCUMENTS

CN   101310434 A   11/2008
CN   101471569 A    7/2009

(Continued)

OTHER PUBLICATIONS

English translation of the International Preliminary Report on Patentability issued Apr. 25, 2013 in PCT/JP2010/066389 filed Sep. 22, 2010.

(Continued)

*Primary Examiner* — Timothy J Dole
*Assistant Examiner* — Yusef Ahmed
(74) *Attorney, Agent, or Firm* — Oblon, McClelland, Maier & Neustadt, L.L.P.

(57) ABSTRACT

There is provided a power converter apparatus including a detector detecting a system voltage, and a controller stably outputting power generated by the wind power generator to the power system based on a power instruction value and controlling an output voltage to stabilize the system voltage based on a voltage instruction value in a case where the system voltage is within a preset range, and controlling an active current component and a reactive current component of an output current to stabilize the system voltage of the power system by use of a voltage drop due to impedance of the power system in a case where the system voltage is outside the preset range.

5 Claims, 4 Drawing Sheets

(56) References Cited

U.S. PATENT DOCUMENTS

| | | | |
|---|---|---|---|
| 5,691,577 A * | 11/1997 | Smith | 307/105 |
| 6,370,039 B1 * | 4/2002 | Telefus | 363/15 |
| 6,380,719 B2 * | 4/2002 | Underwood et al. | 322/36 |
| 6,566,764 B2 * | 5/2003 | Rebsdorf et al. | 290/44 |
| 7,095,130 B2 * | 8/2006 | Ichinose et al. | 290/44 |
| 7,239,036 B2 * | 7/2007 | D'Atre et al. | 290/44 |
| 7,471,007 B2 * | 12/2008 | Bucker et al. | 290/44 |
| 7,586,216 B2 * | 9/2009 | Li et al. | 307/151 |
| 7,605,487 B2 * | 10/2009 | Barton et al. | 290/44 |
| 7,733,066 B2 * | 6/2010 | Ichinose et al. | 322/29 |
| 7,939,954 B2 * | 5/2011 | Ruiz Flores et al. | 290/44 |
| 7,952,232 B2 * | 5/2011 | Burra et al. | 307/64 |
| 7,964,980 B2 * | 6/2011 | Ichinose et al. | 290/44 |
| 8,093,741 B2 * | 1/2012 | Ritter et al. | 290/44 |
| 8,664,788 B1 * | 3/2014 | Wagoner et al. | 290/44 |
| 2003/0214823 A1 * | 11/2003 | Kawazoe et al. | 363/37 |
| 2005/0013145 A1 * | 1/2005 | Huber | 363/34 |
| 2006/0192390 A1 * | 8/2006 | Juanarena Saragueta et al. | 290/44 |
| 2007/0108771 A1 * | 5/2007 | Jones et al. | 290/44 |
| 2007/0177314 A1 * | 8/2007 | Weng | F03D 9/003 361/20 |
| 2009/0085354 A1 * | 4/2009 | Tan et al. | 290/44 |
| 2009/0147549 A1 * | 6/2009 | Jones | H02M 5/4585 363/37 |
| 2009/0189393 A1 * | 7/2009 | Tyagi | F03D 9/002 290/44 |
| 2010/0025995 A1 * | 2/2010 | Lang et al. | 290/44 |
| 2010/0298991 A1 * | 11/2010 | Alonso Sadaba et al. | 700/276 |
| 2010/0332040 A1 * | 12/2010 | Garcia | F03D 7/0284 700/287 |
| 2011/0057444 A1 * | 3/2011 | Dai et al. | 290/44 |
| 2011/0074151 A1 * | 3/2011 | Burra et al. | 290/44 |
| 2011/0103110 A1 * | 5/2011 | Godridge et al. | 363/74 |
| 2011/0140438 A1 * | 6/2011 | Delmerico | H02M 5/4585 290/55 |
| 2011/0141773 A1 * | 6/2011 | Larsen | H02J 3/36 363/35 |
| 2011/0156388 A1 * | 6/2011 | Yasugi et al. | 290/44 |
| 2012/0056602 A1 * | 3/2012 | Li et al. | 322/89 |
| 2012/0140532 A1 * | 6/2012 | Tallam et al. | 363/37 |
| 2013/0016537 A1 * | 1/2013 | Deng | 363/34 |
| 2013/0033907 A1 * | 2/2013 | Zhou et al. | 363/37 |

FOREIGN PATENT DOCUMENTS

| | | |
|---|---|---|
| JP | 64-69222 | 3/1989 |
| JP | 11-262187 | 9/1999 |
| JP | 2000-78896 | 3/2000 |
| JP | 2002-238248 | 8/2002 |

OTHER PUBLICATIONS

English translation of the Written Opinion of the International Searching Authority issued Dec. 21, 2010 in PCT/JP2010/066389 filed Sep. 22, 2010.

International Search Report issued on Dec. 21, 2010 for PCT/JP2010/066389 filed on Sep. 22, 2010 with English Translation.

International Written Opinion issued on Dec. 21, 2010 for PCT/JP2010/066389 filed on Sep. 22, 2010.

Combined Chinese Office Action and Search Report issued Sep. 3, 2014 in Patent Application No. 201080069207.4 (with partial English language translation).

Combined Chinese Office Action issued May 11, 2015 in Patent Application No. 201080069207.4 (with English Translation).

* cited by examiner

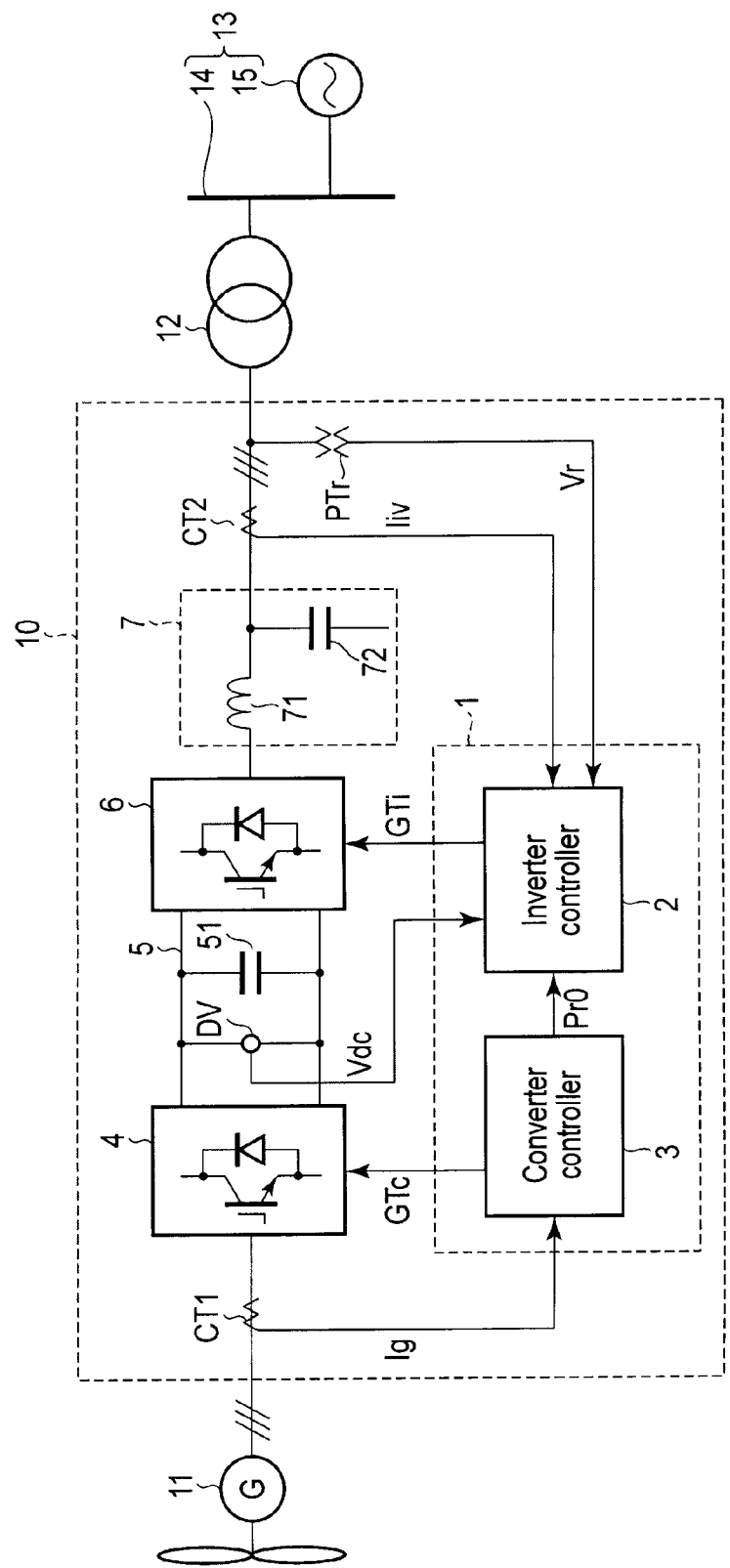
F I G. 1

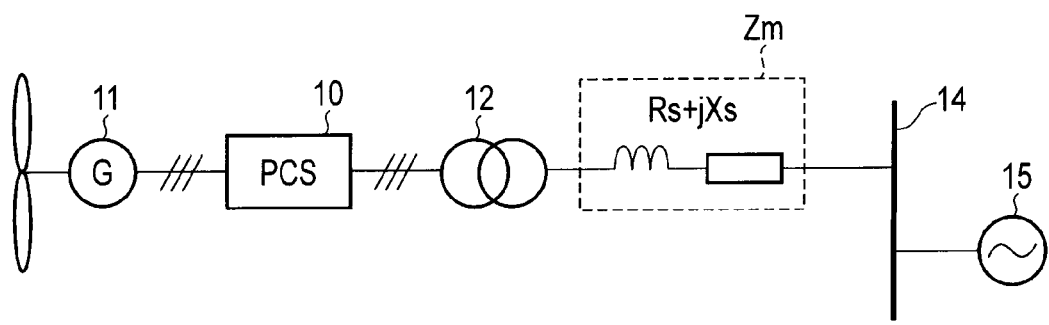
F I G. 5

POWER CONVERTER APPARATUS APPLIED TO WIND POWER GENERATION SYSTEM

CROSS REFERENCE TO RELATED APPLICATIONS

This application is a Continuation Application of PCT Application No. PCT/JP2010/066389, filed Sep. 22, 2010, the entire contents of which are incorporated herein by reference.

BACKGROUND OF THE INVENTION

1. Field of the Invention

The invention relates to a power converter apparatus applied to a wind power generation system.

2. Description of the Related Art

Generally, in a wind power generation system, a reactive power compensation apparatus such as a static var compensator (SVC) or static synchronous compensator (STATCOM) is provided for stabilization of a system voltage.

Further, a wind power generation facility that controls reactive power by means of an inverter and reactive power compensation apparatus capable of controlling reactive power is disclosed (see, Jpn Pat. Appln. KOKAI Publication No. 2000-78896).

However, installation of the reactive power compensation apparatus increases the cost of the wind power generation system. Further, a large amount of wind power generation systems are recently introduced and a reduction in the power system stability at the system voltage lowering time are feared. Therefore, it is required for the wind power generation system to have a function of maintaining the system voltage over a wide voltage range. However, normal reactive power control in the conventional wind power generation system is not sufficient as control for stabilizing the system voltage.

BRIEF SUMMARY OF THE INVENTION

An object of the invention is to provide a power converter apparatus capable of controlling system voltage stabilization.

In accordance with an aspect of the invention, there is provided a power converter apparatus that is applied to a wind power generation system and converts power generated by a wind power generator to alternating-current power supplied for a power system, the power converter apparatus comprising a system voltage detector configured to detect a system voltage of the power system; and a controller configured to stably output power generated by the wind power generator to the power system based on a power instruction value from a higher level controller and to control an output voltage of the power converter apparatus to stabilize the system voltage of the power system based on an alternating-current voltage instruction value in a case where the system voltage detected by the system voltage detector is within a preset range, and configured to control an active current component and a reactive current component of an output current of the power converter apparatus to stabilize the system voltage of the power system by use of a voltage drop due to impedance of the power system in a case where the system voltage detected by the system voltage detector is outside the preset range.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing the structure of a wind power generation system to which a power conditioner according to an embodiment of the invention is applied.

FIG. 5 is a schematic view showing a system impedance model used for controlling system voltage stabilization by means of the inverter controller according to the embodiment.

DETAILED DESCRIPTION OF THE INVENTION

Figure 2:
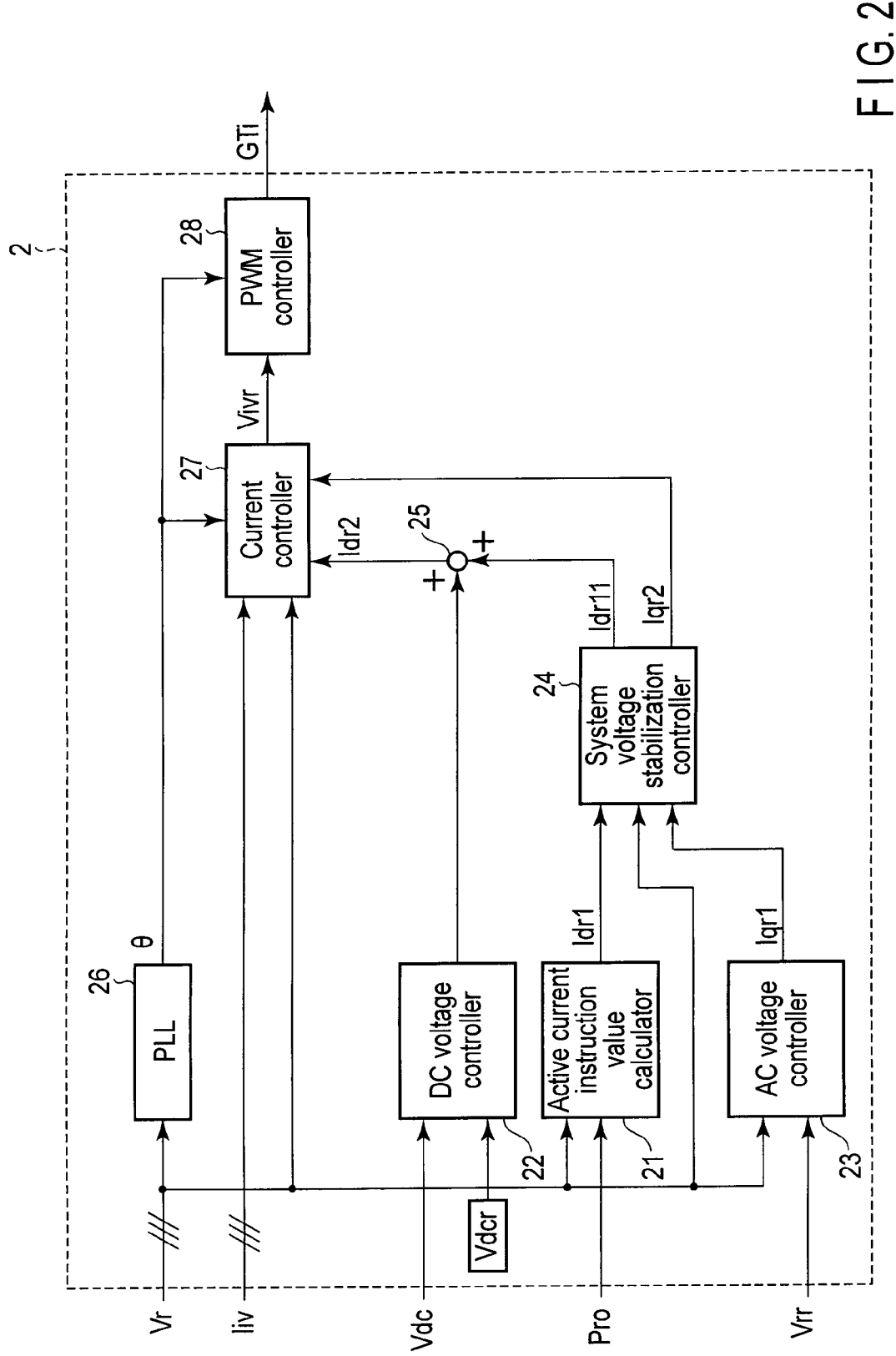
FIG. 2 is a block diagram showing the structure of an inverter controller of the power conditioner according to the embodiment.

Embodiments according to the invention will now be described hereinafter with reference to the drawings.

(Embodiment)

FIG. 1 is a block diagram showing the structure of a wind power generation system to which a power conditioner 10 according to an embodiment of the invention is applied. The same symbols are attached to the same portions in the drawings, the detailed explanation thereof is omitted and different portions are mainly described. This applies to the following embodiments and the repetitive explanation is omitted.

A wind power generation system according to the embodiment includes a wind power generator 11, a power conditioner (PCS, Power Conditioning System) 10, an interconnection transformer 12 and a power system 13.

The wind power generator 11 is a permanent magnetic synchronous generator (PMSG). The wind power generator 11 makes use of wind power to generate electricity. For example, when the wind power generator 11 is a PMSG that is directly driven without using a high-speed gear, the wind power generator 11 outputs an alternating-current voltage of 10 to 20 Hz to the power conditioner 10.

A system bus 14 and a system power supply 15 that supplies power to the system bus 14 are contained in the power system 13. The frequency of power generated by the system power supply 15 is 50 or 60 Hz, for example. The system bus 14 is connected to the power conditioner 10 via the interconnection transformer 12.

The power conditioner 10 is a power converter apparatus that converts alternating-current power supplied from the wind power generator 11 to alternating-current power synchronized with system voltage Vr. The power conditioner 10 supplies the converted alternating-current power to the power system 13 via the interconnection transformer 12.

The power conditioner 10 includes a converter 4, a direct-current link 5, an inverter 6, an alternating-current filter 7, a control device 1, an alternating-current detector CT1, an alternating-current detector CT2 and an alternating-current voltage detector PTr.

The control device 1 includes a converter controller 3 that controls the converter 4 and an inverter controller 2 that controls the inverter 6.

The alternating-current current detector CT1 is provided on the input side of the power conditioner 10. The alternating-current detector CT1 is a detector that measures output current (input current to the converter 4) Ig of the wind power generator 11. The alternating-current detector CT1 outputs the detected output current Ig of the wind power generator 11 as a signal to the converter controller 3.

The alternating-current current detector CT2 is provided on the output side of the power conditioner 10. The alternating-current detector CT2 is a detector that measures output current Iiv of the inverter 6. The alternating-current detector CT2 outputs the detected output current Iiv of the wind power generator 11 as a signal to the inverter controller 2.

The alternating-current voltage detector PTr is provided on the output side of the power conditioner 10. The alternating-current voltage detector PTr is a detector that measures a voltage on the output side of the power conditioner 10. The alternating-current voltage detector PTr outputs the detected voltage as a signal used for measuring system voltage Vr of the power system 13 to the inverter controller 2.

The alternating-current side of the converter 4 is connected to the wind power generator 11. The direct-current side of the converter 4 is connected to the direct-current side of the inverter 6 via the direct-current link 5. That is, the converter 4, the direct-current link 5 and inverter 6 constitute a back-to-back (BTB) converter. The alternating-current filter 7 is connected to the output side of the inverter 6.

The converter 4 converts alternating-current power input from the wind power generator 11 to direct-current power. The converter 4 outputs the converted direct-current power to the inverter 6 via the direct-current link 5.

The direct-current link 5 connects the positive polarities and negative polarities of the converter 4 and inverter 6 to one another. A capacitor 51 is connected between the positive polarity and negative polarity of the direct-current link 5. The capacitor 51 smoothes the direct-current power supplied to the direct-current link.

The inverter 6 converts the direct-current power input from the converter 4 to alternating-current power synchronized with the power system 13. The inverter 6 outputs the converted alternating-current power to the interconnection transformer 12 via the alternating-current filter 7.

The alternating-current filter 7 includes a reactor 71 and capacitor 72. The alternating-current filter 7 suppresses harmonic currents flowing out from the inverter 6 to the power system 13.

The direct-current voltage detector DV is connected between the positive polarity and negative polarity of the direct-current link 5. The direct-current voltage detector DV is a detector that measures direct-current voltage (voltage across the capacitor 51) Vdc between the positive polarity and negative polarity of the direct-current link 5. The direct-current voltage detector DV outputs the detected direct-current voltage Vdc as a signal to the inverter controller 2.

The output current Ig of the wind power generator 11 detected by the alternating-current detector CT1 is input to the converter controller 3. The converter controller 3 generates gate signal GTc used for controlling the converter 4 based on the output current Ig of the wind power generator 11. The converter controller 3 outputs the generated gate signal GTc to the converter 4 and controls the converter 4. The converter controller 3 outputs active power instruction value Pr0 used for controlling the inverter 6 to the inverter controller 2.

FIG. 2 is a block diagram showing the structure of the inverter controller 2 according to the embodiment.

The inverter controller 2 generates gate signal GTi based on the active power instruction value Pr0 input from the converter controller 3, the system voltage Vr detected by the alternating-current voltage detector PTr, the output current Iiv detected by the alternating-current detector CT2, the direct-current voltage Vdc detected by the direct-current voltage detector DV and preset direct-current voltage instruction value Vdcr. The inverter controller 2 outputs the generated gate signal GTi to the inverter 6 and controls the inverter 6.

The inverter controller 2 includes an active current instruction value calculator 21, a direct-current voltage controller 22, an alternating-current voltage controller 23, a system voltage stabilization controller 24, an adder 25, a phase-locked loop (PLL) 26, a current controller 27 and a pulse width modulation (PWM) controller 28.

The active power instruction value Pr0 output from the converter controller 3 and the system voltage Vr detected by the alternating-current voltage detector PTr are input to the active current instruction value calculator 21. The active current instruction value calculator 21 calculates active current instruction value Idr1 based on the active power instruction value Pr0 and the system voltage Vr. The active current instruction value calculator 21 outputs the calculated active current instruction value Idr1 to the system voltage stabilization controller 24.

The direct-current voltage Vdc detected by the direct-current voltage detector DV is input to the direct-current voltage controller 22. The direct-current voltage controller 22 calculates a value used for correcting the direct-current voltage Vdc to follow the preset direct-current voltage instruction value Vdcr. The direct-current voltage controller 22 outputs the calculated value to the adder 25.

An alternating-current voltage instruction value Vrr output from a higher level control system and the system voltage Vr detected by the alternating-current voltage detector PTr are input to the alternating-current voltage controller 23. The alternating-current voltage controller 23 calculates reactive current instruction value Iqr1 based on the alternating-current voltage instruction value Vrr and the system voltage Vr. The alternating-current voltage controller 23 outputs the calculated reactive current instruction value Iqr1 to the system voltage stabilization controller 24.

The system voltage stabilization controller 24 controls the inverter 6 to perform a computation to control system voltage stabilization of the power system 13. The active current instruction value Idr1 calculated by the active current instruction value calculator 21, the reactive current instruction value Iqr1 calculated by the alternating-current voltage controller 23 and the system voltage Vr detected by the alternating-current voltage detector PTr are input to the system voltage stabilization controller 24. The system voltage stabilization controller 24 calculates active current instruction value Idr11 and reactive current instruction value Iqr2 based on the active current instruction value Idr1, the reactive current instruction value Iqr1 and the system voltage Vr. The system voltage stabilization controller 24 outputs the calculated active current instruction value Idr11 to the adder 25. The system voltage stabilization controller 24 outputs the calculated reactive current instruction value Iqr2 to the current controller 27.

The adder 25 adds together the active current instruction value Idr11 input from the voltage stabilization controller 24 and the value input from the direct-current voltage controller 22. The adder 25 outputs the sum as active current instruction value Idr2 to the current controller 27.

The system voltage Vr detected by the alternating-current voltage detector PTr is input to the PLL 26. The PLL 26 calculates phase angle θ to attain synchronization with the system voltage Vr based on the system voltage Vr. The PLL 26 outputs the calculated phase angle θ to the current controller 27 and the PWM controller 28.

The system voltage Vr detected by the alternating-current voltage detector PTr, the output current Iiv detected by the alternating-current detector CT2, the active current instruction value Idr2 calculated by the adder 25, the reactive current instruction value Iqr2 calculated by the system voltage stabilization controller 24 and the phase angle θ calculated by the PLL 26 are input to the current controller 27. The current controller 27 calculates output voltage instruction value Vivr used as a control instruction with respect to an output voltage of the inverter 6 to cause the output current Iiv of the inverter 6 to follow the active current instruction value Idr2 and the reactive current instruction value Iqr2. The current controller 27 outputs the calculated output voltage instruction value Vivr to the PWM controller 28.

The phase angle θ calculated by the PLL 26 and the output voltage instruction value Vivr calculated by the current controller 27 are input to the PWM controller 28. The PWM controller 28 generates gate signal GTi used for controlling the inverter 6 based on the phase angle θ and the output voltage instruction value Vivr. The PWM controller 28 outputs the generated gate signal GTi to the inverter 6.

Figure 3:
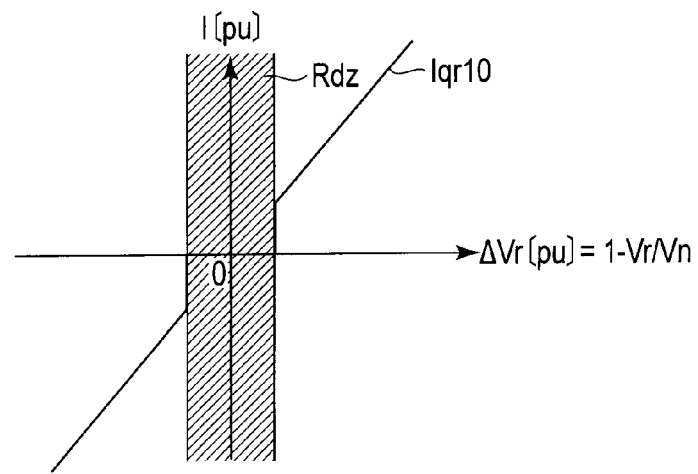
FIG. 3 is a characteristic diagram showing a system voltage stabilization control table used for controlling system voltage stabilization by means of the inverter controller according to the embodiment.

FIG. 3 is a characteristic diagram showing a system voltage stabilization control table used in the system voltage stabilization controller 24 according to the embodiment. The abscissa represents system voltage variation rate ΔVr (1−System voltage Vr/Rated voltage Vn). The ordinate represents current (pu value: /Rated current).

A system voltage stabilization control table shown in FIG. 3 is implemented in the system voltage stabilization controller 24. In the system voltage stabilization control table, reactive current instruction value Iqr10 corresponding to the system voltage variation rate ΔVr is determined. In the system voltage stabilization control table, dead zone Rdz with respect to system voltage variation rate ΔVr is provided. For example, the dead zone Rdz is set within ±10% with respect to the rated voltage Vr. In a case where the system voltage variation rate ΔVr is within the dead zone Rdz, the system voltage stabilization controller 24 calculates the active current instruction value Idr11 and the reactive current instruction value Iqr2 based on the active current instruction value Idr1 and reactive current instruction value Iqr1.

In a case where the system voltage variation rate ΔVr is deviated from the dead zone Rdz, the system voltage stabilization controller 24 calculates the active current instruction value Idr11 and the reactive current instruction value Iqr2 based on the system voltage variation rate ΔVr by use of the system voltage stabilization control table.

Figure 4:
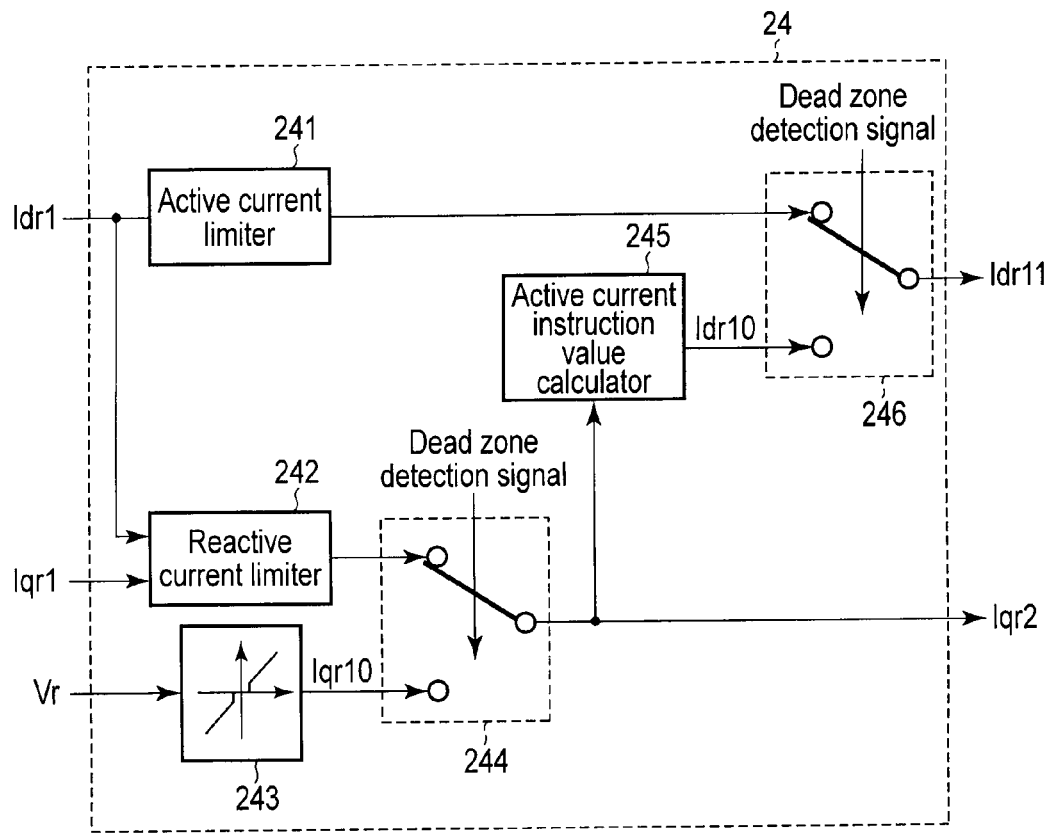
FIG. 4 is a block diagram showing the structure of a system voltage stabilization controller according to the embodiment.

FIG. 4 is a block diagram showing the structure of the system voltage stabilization controller 24 according to the embodiment.

The system voltage stabilization controller 24 includes an active current limiter 241, a reactive current limiter 242, a system voltage stabilization control table 243, a reactive current changeover switch 244, an active current instruction value calculator 245 and an active current changeover switch 246.

In a case where the system voltage variation rate ΔVr is within the dead zone Rdz, the two changeover switches 244, 246 select the upper side. In a case where the system voltage variation rate ΔVr is deviated from the dead zone Rdz, the changeover switches 244, 246 are switched to select the lower side according to a dead zone detection signal indicating that the system voltage variation rate ΔVr is present outside the dead zone Rdz.

In a case where the system voltage variation rate ΔVr is within dead zone Rdz (in a case where the changeover switches 244, 246 select the upper terminals), the system voltage stabilization controller 24 performs the following control operation.

The active current instruction value Idr1 is input to the active current limiter 241. The active current limiter 241 limits the active current instruction value Idr1 to a range in which the value can be output from the inverter 6. The active current limiter 241 inputs the limited active current instruction value Idr1 to the upper terminal of the active current changeover switch 246.

The active current changeover switch 246 outputs the value in which the active current instruction value Idr1 input to the upper terminal is limited as the active current instruction value Idr11 calculated by the system voltage stabilization controller 24.

The active current instruction value Idr1 and the reactive current instruction value Iqr1 are input to the reactive current limiter 242. The reactive current limiter 242 limits the reactive current instruction value Iqr1 to preferentially output an active current based on the active current instruction value Idr1. The reactive current limiter 242 inputs the limited reactive current instruction value Iqr1 to the upper terminal of the reactive current changeover switch 244.

The reactive current changeover switch 244 outputs a value in which the reactive current instruction value Iqr1 input to the upper terminal is limited as the reactive current instruction value Iqr2 calculated by the system voltage stabilization controller 24.

In a case where the system voltage variation rate ΔVr is present outside dead zone Rdz (in a case where the changeover switches 244, 246 select the lower terminals), the system voltage stabilization controller 24 performs the following control operation.

The system voltage Vr is input to the system voltage stabilization control table 243. The system voltage stabilization control table 243 calculates the system voltage variation rate ΔVr based on the system voltage Vr. The system voltage stabilization control table 243 calculates the reactive current instruction value Iqr10 corresponding to the system voltage variation rate ΔVr according to the characteristic diagram shown in FIG. 3. The system voltage stabilization control table 243 inputs the calculated reactive current instruction value Iqr10 to the lower terminal of the reactive current changeover switch 244.

The reactive current changeover switch 244 outputs the reactive current instruction value Iqr10 input to the lower terminal as the reactive current instruction value Iqr2 calculated by the system voltage stabilization controller 24. Further, the reactive current changeover switch 244 outputs the reactive current instruction value Iqr10 to the active current instruction value calculator 245.

The reactive current instruction value Iqr10 is input to the active current instruction value calculator 245 from the reactive current changeover switch 244. The active current instruction value calculator 245 calculates active current instruction value Idr10 based on the reactive current instruction value Iqr10. The active current instruction value Idr10 is derived according to the equation below. The active current instruction value calculator 245 inputs the calculated active current instruction value Idr10 to the lower terminal of the active current changeover switch 246.

$$\text{Active current instruction value } Idr10 = \sqrt{(1 - \text{Square of reactive current instruction value } Iqr10)} \quad \text{Eq. (1)}$$

The active current changeover switch 246 outputs the active current instruction value Idr10 input to the lower terminal as the active current instruction value Idr11 calculated by the system voltage stabilization controller 24.

FIG. 5 is a schematic view showing a system impedance model used for controlling system voltage stabilization by means of the inverter controller 2 according to the embodiment.

System impedance Zm is simulated by use of resistance component Rs and reactance component Xs (Zm=Rs+jXs).

The inverter controller 2 controls an active current component and a reactive current component of output current Iiv of the inverter 6 to stabilize the system voltage by use of a voltage drop due to the system impedance Zm.

According to the embodiment, even when the system voltage Vr fluctuates to be deviated from the dead zone, the system voltage Vr can automatically be controlled to be stabilized by controlling the inverter 6 according to the system voltage stabilization control table in which preset dead zone Rdz is provided.

As a result, it becomes possible to control system voltage stabilization without providing a reactive power compensation device as the wind power generation system.

The present invention is not limited to the above-described embodiments, but may be modified in various ways without departing from the scope. Various inventions can be realized by appropriately combining the structural elements disclosed in the embodiments. For instance, some of the disclosed structural elements may be deleted. Some structural elements of different embodiments may be combined appropriately.

What is claimed is:

1. A power converter apparatus that is applied to a wind power generation system and converts power generated by a wind power generator to alternating-current power supplied for a power system, the power converter apparatus comprising:
   a system voltage detector configured to detect a system voltage of the power system;
   a converter controller configured to be exclusively controlled by an alternating-current detected from the wind power generator, generate a power instruction value and a gate signal only based on the alternating-current and input the generated gate signal to a converter that converts the alternating-current to a direct-current:
   an inverter controller configured to receive the generated power instruction value from the converter controller; and
   an inverter configured to convert the direct-current converted by the converter to the alternating-current power supplied for the power system,
   wherein the inverter controller is configured to control the inverter to stably output power generated by the wind power generator to the power system based on another power instruction value from a higher level controller and to control an output voltage of the inverter to stabilize the system voltage of the power system based on an alternating-current voltage instruction value when the system voltage detected by the system voltage detector is within a preset range having an upper limit and a lower limit, and configured to control an output current of the inverter such that an active current component and a reactive current component are those corresponding to a variation rate of the system voltage to stabilize the system voltage of the power system by use of a voltage drop due to impedance of the power system when the system voltage detected by the system voltage detector is outside the preset range.

2. The power converter apparatus according to claim 1, wherein the impedance of the power system is simulated by a resistance component and a reactance component.

3. The power converter apparatus according to claim 2, wherein
   the converter controller is configured to calculate the power instruction value and controls the converter; and
   the inverter controller is configured to control the inverter based on the power instruction value calculated by the converter controller when the system voltage is within the preset range.

4. The power converter apparatus according to claim 1, wherein
   the converter controller is configured to calculate the power instruction value and controls the converter; and
   the inverter controller is configured to control the inverter based on the power instruction value calculated by the converter controller when the system voltage is within the preset range.

5. A control method of controlling a power converter apparatus that is applied to a wind power generation system and converts power generated by a wind power generator to alternating-current power supplied for a power system, the control method comprising:
   detecting a system voltage of the power system;
   controlling a converter controller of the power converter apparatus exclusively by an alternating-current detected from the wind power generator;
   generating a power instruction value and a gate signal only based on the alternating-current;
   inputting the generated gate signal to a converter that converts the alternating-current to a direct-current;
   receiving, by an inverter controller, the generated power instruction value from the converter controller;
   converting, by an inverter, the direct-current converted by the converter to the alternating-current power supplied for the power system; and
   stably outputting, by the inverter controller, power generated by the wind power generator to the power system based on another power instruction value from a higher level controller and controlling an output voltage of the inverter to stabilize the system voltage of the power system based on an alternating-current voltage instruction value when the system voltage detected is within a preset range having an upper limit and a lower limit, and controlling an output current of the inverter such that an active current component and a reactive current component are those corresponding to a variation rate of the system voltage to stabilize the system voltage of the power system by use of a voltage drop due to impedance of the power system when the system voltage detected is outside the preset range.

* * * * *